United States Patent [19]

Hagen et al.

[11] Patent Number: 5,700,375

[45] Date of Patent: Dec. 23, 1997

[54] PARTICLE LOADED MEMBRANES AS OXIDANT SCAVENGERS

[75] Inventors: Donald F. Hagen, Woodbury; Kenneth M. Hart, Oakdale; Glenn D. Johnson, Mahtomedi, all of Minn.

[73] Assignee: Minnesota Mining and Manufacturing Company, St. Paul, Minn.

[21] Appl. No.: 639,591

[22] Filed: Apr. 29, 1996

[51] Int. Cl.⁶ ........................................ B01D 61/00

[52] U.S. Cl. .................. 210/651; 210/653; 210/502.1; 210/500.4; 210/503; 210/508; 95/43; 95/45; 95/46; 95/47; 96/4

[58] Field of Search .............................. 210/651, 653, 210/635, 502.1, 500.1, 503, 505, 508, 660; 96/4; 95/43, 45, 46, 47

[56] References Cited

U.S. PATENT DOCUMENTS

| | | | |
|---|---|---|---|
| 4,248,736 | 2/1981 | Fuchigami et al. | 210/502.1 |
| 4,664,683 | 5/1987 | Degen et al. | 210/502.1 |
| 4,853,001 | 8/1989 | Hammel | 95/47 |
| 5,071,610 | 12/1991 | Hagen | 264/120 |
| 5,248,616 | 9/1993 | Beckman et al. | 95/46 |
| 5,403,548 | 4/1995 | Aibe et al. | 422/5 |
| 5,482,773 | 1/1996 | Bair | 428/368 |

FOREIGN PATENT DOCUMENTS

| | | |
|---|---|---|
| 0 443 853 A2 | 8/1991 | European Pat. Off. . |
| 0 661 094 A2 | 7/1995 | European Pat. Off. . |
| 0 662 340 A1 | 7/1995 | European Pat. Off. . |
| 0 697 238 A2 | 2/1996 | European Pat. Off. . |
| 0 699 470 A1 | 3/1996 | European Pat. Off. . |
| 93/00163 | 1/1993 | WIPO . |

*Primary Examiner*—Ana Fortuna
*Attorney, Agent, or Firm*—Lorraine R. Sherman

[57] ABSTRACT

An efficient method removes oxidants from fluids (gases and liquids, particularly air) by means of solid phase extraction or reaction. The solid phase extraction or reaction medium comprises a porous, preferably fibrous, polymeric, membrane or web in which are incorporated oxidant scavenger particulates. Typical oxidants removed in the method include ozone, oxides of nitrogen, halogen, and peroxides. The method of the invention protects organic analytes in analytical applications and removes oxidants in remediation applications by use of oxidant scavenger particles in porous membranes.

23 Claims, No Drawings

PARTICLE LOADED MEMBRANES AS OXIDANT SCAVENGERS

FIELD OF THE INVENTION

This invention relates to the detection and removal of ambient oxidants from a fluid using a reactive or sorptive particle-loaded membrane in a solid phase extraction process. In another aspect, there are disclosed methods of making and using the reactive membranes of the invention.

BACKGROUND OF THE INVENTION

Extraction and chromatographic processes, which can be broadly described as separation science, are known. They provide a means of isolating, separating, and analyzing components of mixtures by selective adsorption on materials such as alumina, silica, bonded silica, and macroporous resins.

Solid phase extraction (SPE) processes use specific solid particles that bind and remove dissolved target molecules or ions from fluids, such as water and air, by ion exchange, chelation, size exclusion or sorptive mechanisms. The molecules or ions can be eluted subsequently from the solid particles for quantitative or qualitative determination in analytical applications. In other applications, SPE processes are utilized to purify fluids, concentrating undesirable contaminants in a sorptive or reactive medium for subsequent disposal.

Solid phase reaction (SPR) processes use specific reactive solid particles as reactants towards molecules or ions present in fluids such as air or water. The molecules or ions are transformed by chemical reaction, such as covalent bond formation, with the reactive solid particles, and the reaction product(s) may be eluted, analyzed, collected, disposed of, etc.

The use of membranes or sheet materials for SPE processes was described in *Analytica Chimica Acta*, 236, 157–164 (1990), wherein fluids containing analytes were brought into contact with sorbent particles enmeshed in an inert poly(tetrafluoroethylene) (PTFE) fibril matrix. The method was also described in LC/GC, 9:5, 332–337 (1991). These particle-loaded membranes comprising small, high-surface area particles of the method were shown to provide a kinetic advantage over particle-packed columns or cartridges.

U.S. Pat. No. 5,279,742 describes a method for isolating, for example, organic contaminants or constituents from a fluid by means of a solid phase extraction medium comprising a PTFE fibril matrix having enmeshed therein sorptive particles selected from the group consisting of a copolymer of styrene and divinylbenzene, a poly(meth)acrylic acid ester, a poly(divinylbenzene), or a derivative of any of the foregoing, and, optionally, organic-coated or uncoated porous inorganic particles.

U.S. Pat. Nos. 5,328,758 and 5,415,779 describe a nonwoven fibrous polymeric web having enmeshed therein sorptive, non-swellable particles, the web being suitable for solid phase extraction of organic or inorganic analytes from a fluid. A method is described wherein a stack of two or more of the particulate-containing solid phase extraction media is used for extraction of one or more classes of analytes.

U.S. Pat. Nos. 5,340,746 and 5,470,532 describe composite reactive (SPR) articles useful for quantifying cyanide ions in solution, wherein the articles can be porous, fibrous membranes having enmeshed therein inert porous inorganic supports having immobilized thereon finely divided gold. When exposed to the gold substrate, cyanide ions in solution react to form soluble gold cyanide, which is subsequently carried through the SPR article in the effluent. Analysis for gold in the effluent provides a quantitative measure of cyanide ions in the original solution.

SUMMARY OF THE INVENTION

Certain analytes when sorbed onto high surface area substrates in solid phase extractions appear to be more susceptible to chemical reactions such as oxidation, hydrogenation, etc. Oxidants, particularly ozone and oxides of nitrogen, which are found at elevated levels in areas of urban smog, can readily oxidize those sensitive analytes, reducing the recovery levels for analytical monitoring.

Briefly, this invention provides a method for removing an oxidant from a fluid comprising the step of passing a fluid comprising the oxidant through a porous membrane having incorporated therein oxidant scavenger particles, the oxidant being active towards organic compounds. The oxidant scavenger particles are themselves reactive or sorptive towards the oxidant or they can be inert particles having a surface coating reactive or sorptive with the oxidant. Preferably, the oxidant is gaseous.

In another aspect, this invention relates to a solid phase reaction article comprising oxidant scavenger particulate incorporated therein, wherein the oxidant has been reacted or sorbed with the scavenger particulate to produce a reduced or immobilized form of the oxidant.

In a further aspect, the invention provides a method of preventing the oxidation of readily oxidized organic analytes sorbed on a particle enmeshed in a porous membrane, the method comprising the step of including in the porous membrane, a particle that sorbs or is itself reactive with oxidants.

In yet another aspect, this invention relates to a composite article comprising a conventional filter or conventional solid phase extraction membrane or web and laminated or stacked in registration therewith an oxidant scavenging membrane comprising a porous membrane having incorporated therein oxidant scavenger particulates that have been oxidized by an oxidant or that have an oxidant sorbed therein.

In this application:

"oxidant scavenger" means an antioxidant;

"particulate" means particles or particles coated with an antioxidant; it can be a fiber;

"membrane" means a particle-loaded porous sheet material; the membrane can be a porous solid sheet material or it can be a nonwoven, fibrous web;

"registration" means superimposition of and correspondence between sheet articles;

"Gurley time" or "Gurley number" means a densometer number (i.e., flow-through time) in seconds for 50 cc of air at 124 mm (4.88 in.) $H_2O$ pressure to pass through a sample of a membrane having a circular cross-sectional area of approximately 645 $mm^2$ (1 square inch). A temperature of approximately 23°–24° C. (74°–76° F.) and 50 percent relative humidity are maintained for consistent measurements; and "polymer pulp" means fibrid particles which are usually frazzled, i.e., in a frayed or tattered condition, having a high specific surface area, and are capable of being formed into a sheet material which preferably is self-supporting.

This invention provides an efficient membrane format for the removal of oxidants from fluids. Oxidants in air, including halogens and peroxides, but particularly ozone and oxides of nitrogen, can have a deleterious effect upon sensitive analytes that are extracted in solid phase extraction (SPE) analytical procedures. Removal of such oxidants in air in such situations can be desirable, thereby minimizing the oxidation of sensitive analytes. In remediation applications, SPE processes can be used to purify fluids, concentrating undesirable contaminants by sorptive or reactive mechanisms for subsequent disposal.

In addition, this invention provides kinetically efficient solid phase extraction media to perform chemical reactions such as destruction of undesirable contaminants in fluids and processes for the synthesis of desirable chemicals.

DETAILED DESCRIPTION OF PREFERRED EMBODIMENTS OF THE INVENTION

The present invention provides an efficient method and medium for removing oxidants, preferably gaseous oxidants or reaction products thereof, from fluids (gases and liquids, particularly air) by means of solid phase reaction or sorption. The medium comprises a porous, preferably polymeric, membrane or web in which are enmeshed oxidant scavenger particulates and optionally conventional solid phase extraction particulates. Representative oxidants that may be removed by the method of the invention include ozone, oxides of nitrogen, halogens, and peroxides. The method is particularly directed towards removal of ozone and $NO_2$. Removal of oxidants can be by sorption or reaction.

Oxidant scavenger particulates act as antioxidants and can be volatile or non-volatile organics and inorganics. Non-volatile and insoluble antioxidant particulates are preferred to minimize loss of antioxidant capacity by evaporation and to minimize interference with analytical procedures. Non-volatile polymeric organic particulates which contain reactive sites include macroporous poly(styrene divinylbenzene) particulates or derivatives thereof or inert support particulates coated with reactive or sorptive polymers such as polybutadiene or derivatives thereof. Reactive sites include carbon—carbon double bonds, tertiary carbon bonds, and other readily oxidizable sites. Oxidant scavenger particulates include coated non-volatile inorganic scavenger materials such as KI coated on various particulates entrapped in membranes. These membranes are effective in removing oxidants, particularly ozone, from air and can add a second utility as a visible indicator of low levels of oxidants. When complexed with starch, visibility is obtained by the strong blue starch-iodine coloration of the surface of the membrane. Membrane diffusion kinetics allow the sorption or reaction to occur preferably in the top 50 micrometers of the membrane surface in concentrated form, greatly enhancing visual detectability compared to particle packed adsorption columns.

More particularly, oxidant scavengers useful in the present invention include poly(butadiene) and poly(styrene-co-divinylbenzene) (SDVB). These polymers can remove ozone from a fluid by chemical reaction of ozone with one or more ozone-reactive centers in the polymer, including carbon—carbon double bonds and tertiary carbon-hydrogen single bonds. Reactions of ozone with these reactive centers is described in, e.g., P. S. Bailey, "Ozonation in Organic Chemistry, Vols. I and II," Academic Press, New York (1978 and 1982, respectively), and in "Ozone Chemistry and Technology," Advances in Chemistry Series, No. 21, American Chemical Society, Washington (1959). Ozone can react readily with carbon—carbon double bonds to form ozonides that rapidly decompose to form, among other compounds, aldehydes, ketones, diols, epoxides, and carboxylic acids, depending on, for example, reaction conditions, solvents, and the steric environment in the region of the double bond. Ozone reactions with carbon-hydrogen single bonds can produce organic peroxides that are stable or that can undergo further transformations to form, for example, hydroxyls and ketones.

Poly(butadiene) can have carbon—carbon double bonds in both the polymer backbone and in pendant vinyl groups, and both types of carbon—carbon double bonds can readily react with ozone. SDVB can have pendant carbon—carbon double bonds (aromatic vinyl groups that did not take part in polymerization) that are capable of reaction with ozone as well as backbone tertiary carbon-hydrogen single bonds, located directly adjacent to pendant phenyl rings, that can also react with ozone. Other oxidants, such as nitrogen oxides, halogens, and peroxides, also are capable of reacting with carbon—carbon double bonds or tertiary carbon-hydrogen single bonds.

Inorganic oxide particles such as silica, alumina, titania, zirconia, and other ceramics can be used as supports onto which are coated or covalently bonded organic groups. Preferred inorganic oxide particulate materials are silica and zirconia because they are commercially available with appropriate size and surface area. Silica, or other support particle, may act primarily as a carrier for the organic and inorganic coatings. Silica is available from Aldrich Chemical Co. (Milwaukee, Wis.). Zirconia is available from Z-Tech Corporation (Bow, N.H.). Other inorganic oxides are commercially available (Aldrich Chemical Co.). Coatings which can be applied to inorganic or organic particulate can be mechanical coatings of inorganic reductants or insoluble polymers having reactive sites such as crosslinked polybutadienes.

Any of the particulate material may have a regular shape such as a spherical shape, or an irregular shape, and can be a fiber. Particulate material which has been found useful in the invention has an apparent size within the range of 0.1 to about 150 micrometers, preferably in the range of 1 to 100 micrometers, more preferably 10 to 100 micrometers. It has been found advantageous in some instances to employ particulate materials in two or more particle size ranges falling within the broad range. As an example, particles having an average size in the range of 0.1-30 micrometers having oxidant scavenger activity may be employed in combination with particles having an average size in the range of 1 to 150 micrometers acting as a property modifier.

Other particularly useful ozone scavenger particulates suitable for the present invention are iminodiacetic acid derivatized poly(styrene divinylbenzene) (Chelex™, Bio-Rad Laboratories, Hercules, Calif.), Silicalite™ molecular sieves (UOP, Des Plaines, Ill.), and activated carbon. In one Example of the present invention, Indigo Blue dye, the chemical structure of which is shown below, was used as an oxidant scavenger. Without wishing to be bound by theory, it is believed that the central carbon—carbon double bond of Indigo Blue can be susceptible to rapid oxidation by ozone, oxides of nitrogen, halogens and peroxides.

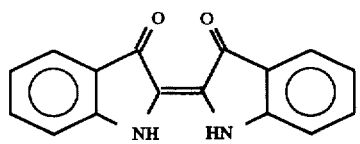

Property modifier particulates may advantageously be added to the primary particulate material to provide further improvement in or modification of the composite articles of the invention. For example, modifier particulate can include inactive materials such as low surface area glass beads to act as property modifiers and processing aids. Coloring or fluorescing particulate can be added at low levels (up to 10 weight percent of particulate) to aid in visualizing reaction products. Chemically active particulate which indicate pH or acidity can be useful in the method of the invention.

A limited amount of property modifiers (i.e., up to 30 weight percent, preferably less than 25 weight percent, more preferably less than 10 weight percent, and most preferably less than 1 weight percent, of total particulate) can be useful as a processing aid. Other representative property modifiers include cellulosics and the like.

It is within the scope of the present invention to incorporate conventional SPE particulates in the membrane of the present invention for their known purposes. Such particulates are known in the art and include poly(styrene divinylbenzene) and derivatives thereof, silica and $C_2$ to $C_{18}$-bonded silica, molecular sieves, and activated carbon or activated carbon coated particles such as zirconia and silicalite.

In preferred embodiments of the invention, solid particles comprise at least about 20 weight percent of the total solid content of the porous membrane, more preferably at least about 50 weight percent, and most preferably at least 95 weight percent and up to about 99 weight percent.

Various porous membranes can be useful in the article of the present invention which are prepared as indicated below. In one embodiment, the oxidant scavenger particulates are enmeshed in a web of fibrillated polytetrafluoroethylene (PTFE).

1. Fibrillated PTFE

The PTFE composite sheet material of the invention is prepared by blending the particulate or combination of particulates employed with a PTFE emulsion until a uniform dispersion is obtained and adding a volume of process lubricant up to approximately one half the volume of the blended particulate. Blending takes place along with sufficient process lubricant to exceed the sorptive capacity of the particles in order to generate the desired porosity level of the resultant article. Preferred process lubricant amounts are in the range of 3 to 200 percent by weight in excess of that required to saturate the particulate, as is disclosed in U.S. Pat. No. 5,071,610, which is incorporated herein by reference. The aqueous PTFE dispersion is blended with the particulate mixture to form a mass having a putty-like or dough-like consistency. The sorptive capacity of the solids of the mixture is noted to have been exceeded when small amounts of water can no longer be incorporated into the mass without separation. This condition should be maintained throughout the entire mixing operation. The dough-like mass is then subjected to intensive mixing at a temperature and for a time sufficient to cause initial fibrillation of the PTFE particles. Preferably the temperature of intensive mixing is up to 90° C., more preferably it is in the range of 0° C. to 90° C., and most preferably 20° C. to 60° C. Minimizing the mixing at the specified temperature is essential in obtaining sorptive or reactive properties.

Mixing times will typically vary from 0.2 to 2 minutes to obtain the necessary initial fibrillation of the PTFE particles. Initial mixing causes partial disoriented fibrillation of a substantial portion of the PTFE particles.

Initial fibrillation generally will be noted to be at an optimum within 60 seconds after the point when all components have been fully incorporated into a dough-like consistency. Mixing beyond this point will produce a composite sheet of inferior reactive or sorptive properties.

Devices employed for obtaining the necessary intensive mixing are commercially available intensive mixing devices which are sometimes referred to as internal mixers, kneading mixers, double-blade batch mixers as well as intensive mixers and twin screw compounding mixers. The most popular mixer of this type is the sigma-blade or sigma-arm mixer. Some commercially available mixers of this type are those sold under the common designations Banbury mixer (Danbury, Conn.), Mogul mixer, C. W. Brabender Prep mixer (C. W. Brabender, South Hackensack, N.J.) and C. W. Brabender sigma-blade mixer. Other suitable intensive mixing devices may also be used.

The soft dough-like mass is then transferred to a calendering device where the mass is calendered between gaps in calendering rolls preferably maintained at a temperature up to 125° C., preferably in the range of 0° C. to about 100° C., more preferably in the range of 20° C. to 60° C. to cause additional fibrillation of the PTFE particles of the mass and consolidation while maintaining the water level of the mass at least at a level of near the sorptive capacity of the solids, until sufficient fibrillation occurs to produce the desired extraction medium. Preferably the calendering rolls are made of a rigid material such as steel. A useful calendering device has a pair of rotatable opposed calendering rolls each of which may be heated and one of which may be adjusted toward the other to reduce the gap or nip between the two. Typically, the gap is adjusted to a setting of 10 millimeters for the initial pass of the mass and, as calendering operations progress, the gap is reduced until adequate consolidation occurs. At the end of the initial calendering operation, the resultant sheet is folded and then rotated 90° to obtain biaxial fibrillation of the PTFE particles. Smaller rotational angles (e.g., 20° to less than 90°) may be preferred in some extraction and chromatographic applications to reduce calender biasing, i.e., unidirectional fibrillation and orientation. Excessive calendering (generally more than two times) reduces the porosity which in turn can reduce the flow-through rate.

During calendering, the lubricant level of the mass is maintained at least at a level of exceeding the absorptive capacity of the solids by at least 3 percent by weight, until sufficient fibrillation occurs and to produce porosity or void volume of at least 30 percent and preferably 40 to 70 percent of total volume. The preferred amount of lubricant is determined by measuring the pore size of the article using, for example, a Coulter Porometer (Coulter, Hialea, Fla.). Increased lubricant results in increased pore size and increased total pore volume as is disclosed in U.S. Pat. No. 5,071,610.

The calendered sheet is then dried under conditions which promote rapid drying yet will not cause damage to the composite sheet or any constituent therein. Preferably drying is carried out at a temperature below 200° C. The preferred means of drying is by use of a forced air oven. The preferred drying temperature range is from 20° C. to about 70° C. The most convenient drying method involves suspending the composite sheet at room temperature for at least 24 hours. The time for drying may vary depending upon the particular composition. Some particulate materials having a tendency to retain water more than others.

The resulting particle-loaded PTFE composite sheet which is of uniform composition resembles chamois cloth, has uniform porosity, and a void volume which is preferably at least 30 percent of total volume.

The PTFE aqueous dispersion employed in producing the PTFE composite sheet of the invention is a milky-white aqueous suspension of minute PTFE particles. Typically, the PTFE aqueous dispersion will contain about 30 percent to about 70 percent by weight solids, the major portion of such solids being PTFE particles having a particle size in the range of about 0.05 to about 0.5 micrometers. The commercially available PTFE aqueous dispersion may contain other ingredients, for example, surfactant materials and stabilizers which promote continued suspension of the PTFE particles.

Such PTFE aqueous dispersions are presently commercially available from E. I. Dupont de Nemours Chemical Corp., for example, under the trade names Teflon™ 30, Teflon™ 30B, or Teflon™ 42. Teflon™ 30 and Teflon™ 30B contain about 59% to about 61% solids by weight which are for the most part 0.05 to 0.5 micrometer PTFE particles and from about 5.5 percent to about 6.5 percent by weight (based on weight of PTFE resin) of non-ionic wetting agent, typically octylphenol polyoxyethylene or nonylphenol polyoxyethylene. Teflon™ 42 contains about 32 to 35% by weight solids and no wetting agent but has a surface layer of organic solvent to prevent evaporation. Also useful as a source of PTFE is FLUON™ (ICI America, Wilmington, Del.).

In other embodiments of the present invention, the fibrous membrane (web) can comprise non-woven, preferably polymeric macro- or microfibers which can be selected from polyamide, polyolefin, polyacrylonitrile, polyacrylate, polyacrylamide, polyester, polyurethane, glass fiber, polyvinylhalide, or a combinatation thereof. If polyvinylhalide is used, it preferably comprises fluorine of at most 75 percent (by weight) and more preferably of at most 65 percent (by weight). Addition of a surfactant to such webs may be desirable to increase the wettability of the component fibers.

2. Macrofibers

Macrofibrous webs can comprise thermoplastic, melt-extruded, large-diameter fibers which have been mechanically-calendered, air-laid, or spunbonded. These fibers have average diameters in the general range of 50 µm to 1000 µm.

Such non-woven webs with large-diameter fibers can be prepared by a spunbond process which is well-known in the art. (See, e.g; U.S. Pat. Nos. 3,338,992, 3,509,009, and 3,528,129, which are incorporated herein by reference, for the fiber preparation processes.) As described in these references, a post-fiber spinning web-consolidation step (i.e., calendering) is required to produce a self-supporting web. Spunbonded webs are commercially available from, for example, AMOCO, Inc. (Napierville, Ill.).

Non-woven webs made from large-diameter staple fibers can also be formed on carding or air-laid machines (such as a Rando-Webber™, Model 12BS made by Curlator Corp., East Rochester, N.Y.), as is well known in the art. See, e.g., U.S. Pat. Nos. 4,437,271, 4,893,439, 5,030,496, and 5,082,720, the processes of which are incorporated herein by reference.

A binder is normally used to produce self-supporting webs prepared by the air-laying and carding processes and is optional where the spunbond process is used. Such binders can take the form of resin systems which are applied after web formation or binder fibers which are incorporated into the web during the air laying process. Examples of such resin systems include phenolic resins and polyurethanes. Examples of common binder fibers include adhesive-only type fibers such as Kodel™ 43UD (Eastman Chemical Products, Kingsport, Tenn.) and bicomponent fibers, which are available in either side-by-side form (e.g., Chisso ES Fibers, Chisso Corp., Osaka, Japan) or sheath-core form (e.g., Melty™ Fiber Type 4080, Unitika Ltd., Osaka, Japan).

Application of heat and/or radiation to the web "cures" either type of binder system and consolidates the web.

Generally speaking, non-woven webs comprising macrofibers have relatively large voids, preferably having a mean pore size in the range of 5.0 to 50 micrometers. Therefore, such webs have low capture efficiency of small-diameter particulate which is introduced into the web. Nevertheless, particulate can be incorporated into the non-woven webs by at least four means. First, where relatively large particulate is to be used, it can be added directly to the web, which is then calendered to actually enmesh the particulate in the web (much like the PTFE webs described previously). Second, particulate can be incorporated into a primary binder system (discussed above) which is applied to the non-woven web. Curing of this binder adhesively attaches the particulate to the web. Third, a secondary binder system can be introduced into the web. Once the particulate is added to the web, the secondary binder is cured (independent of the primary system) to adhesively incorporate the particulate into the web. Fourth, where a binder fiber has been introduced into the web during the air laying or carding process, such a fiber can be heated above its softening temperature. This adhesively captures particulate which is introduced into the web. Of these methods involving non-PTFE macrofibers, those using a binder system are generally the most effective in capturing particulate. Adhesive levels which will promote point contact adhesion are preferred.

Once the sorptive or reactive particulate has been added, the particle-loaded webs are typically further consolidated by, for example, a calendering process. This further enmeshes the particulate within the web structure.

Webs comprising larger diameter fibers (i.e., fibers which have average diameters between 50 µm and 1000 µm) have relatively high flow rates because, as noted above, they have a relatively large mean void size.

3. Microfibers

When the fibrous web comprises non-woven microfibers, those microfibers provide thermoplastic, melt-blown polymeric materials having active particulate dispersed therein. Preferred polymeric materials include such polyolefins as polypropylene and polyethylene, preferably further comprising a surfactant, as described in, for example, U.S. Pat. No. 4,933,229, the process of preparation of which is incorporated herein by reference. Alternatively, surfactant can be applied to a blown microfibrous (BMF) web subsequent to web formation. Particulate can be incorporated into BMF webs as described in U.S. Pat. No. 3,971,373, the process of which is incorporated herein by reference.

Microfibrous webs of the present invention have average fiber diameters up to 50 µm, preferably from 2 µm to 25 µm, and most preferably from 3 µm to 10 µm. Because the void sizes in such webs range from 0.1 µm to 10 µm, preferably from 0.5 µm to 5 µm, flow through these webs is not as great as is flow through the macroporous webs described above.

The present invention particle-loaded fibrous article, which preferably is a microfibrous article, which has been compressed to increase its density and decrease interstitial porosity comprises in the range of 30 to 70 volume percent fibers and particulate, preferably 40 to 60 volume percent fibers and particulate, and 70 to 30 volume percent air, preferably 60 to 40 volume percent air. In general, compressed or fused sheet-like articles (see, for example, U.S. Pat. No. 5,328,758) are at least 20 percent, preferably 40 percent, more preferably 50 percent, and most preferably 75 percent reduced in thickness compared to uncompressed articles. The article comprises pores having a mean pore size in the range of 0.1 to 10 micrometers, preferably 0.5 to 5 micrometers.

Blown fibrous webs are characterized by an extreme entanglement of fibers, which provides coherency and strength to an article and also adapts the web to contain and retain particulate matter. The aspect ratio (ratio of length to diameter) of blown fibers approaches infinity, though the fibers have been reported to be discontinuous. The fibers are long and entangled sufficiently such that it is generally impossible to remove one complete fiber from the mass of fibers or to trace one fiber from beginning to end.

4. Solution-Cast Porous Membranes

Solution-cast porous membranes can be provided by methods known in the art. Such polymeric porous membranes can be made, for example, from polyolefin (including polypropylene), and polyamide, polyester, polyvinyl acetate, and polyvinyl chloride.

5. Fibrous Pulps

Generally, the fibers that make up the porous polymeric pulp of the SPR sheet of the present invention can be any pulpable fiber (i.e., any fiber that can be made into a porous pulp). The main fiber generally can have a length in the range of 0.8 mm to 4.0 mm, and an average diameter in the range of less than 1 to 20 micrometers, preferably less than 1 to 12 micrometers. Preferred fibers are those that are stable to radiation and/or to a variety of pHs, especially very high pHs (e.g., pH=14) and very low pHs (e.g., pH=1). Examples include polyaramid and polyamide fibers and those polyolefin fibers that can be formed into a pulp including, but not limited to, polyethylene and polypropylene. Particularly preferred fibers are aromatic polyamide fibers and aramid fibers because of their stability to both radiation and highly caustic fluids. Examples of useful polyamide fibers are those fibers of the nylon family.

Examples of useful aramid fibers are those fibers sold under the trade name Kevlar™ (DuPont, Wilmington, Del.). Kevlar fiber pulps are commercially available in three grades based on the length of the fibers that make up the pulp. Regardless of the type of fiber(s) chosen to make up the pulp, the relative amount of fiber in the resulting sheet (when dried) ranges from about 12.5 percent to about 30 percent (by weight), preferably from about 15 percent to 25 percent (by weight).

Sheet materials of polymer pulp(s) are prepared in a wet-laid process by dispersing the polymer pulp(s) with particulate, optionally in the presence of a hydrocarbon binder, preferably using a blender, in the presence of a suitable liquid, preferably water, or water-miscible organic solvent such as alcohol or water-alcohol. The dispersion is poured through a fine screen preferably having pores of about 0.14 mm (100 mesh) to provide a wet sheet, which is then pressed to remove additional liquid. The sheet is then dried, preferably by heating, to provide a dry sheet having an average thickness in the range of about 0.1 mm to less than 10 mm, preferably 0.2 mm to 9 mm, more preferably 0.2 mm to 8 mm, most preferably 0.3 mm to 5 mm, and even more preferably 0.4 to 3 mm, and a Gurley porosity, defined below, preferably of at least 0.1 seconds. Up to 100 percent of the liquid can be removed, preferably up to 90 percent. Calendering can be used to provide additional compressing or fusing, when desired. The sheet resembles porous, unglazed paper that may have color, depending upon its components.

To enable entrapment of higher levels of particulate, a binder can be used. Useful optional binders in the sheet of the present invention are those materials that exhibit little or no interaction (i.e., chemical reaction) with either the fibers of the pulp or the particles entrapped therein. Polymeric hydrocarbon materials, originally in the form of latexes, have been found to be especially useful. Common examples of useful binders include, but are not limited to, natural rubbers, neoprene, styrene-butadiene copolymer, acrylate resins, and polyvinyl acetate. Preferred binders include neoprene and styrene-butadiene copolymer. In some cases, the binder (i.e., styrene-butadiene copolymer) can act as an oxidant scavenger. Regardless of the type of binder used, the relative amount of binder in the resulting sheet (when dried) is about 3 percent to about 7 percent, preferably about 5 percent. The preferred amount has been found to provide sheets with nearly the same physical integrity as sheets that include about 7 percent binder while allowing for as great a particle loading as possible. It may be desirable to add a surfactant to the fibrous pulp, preferably in small amounts up to about 0.25 weight percent of the composite.

Because the capacity and efficiency of the sheet depends on the amount of particles included therein, high particle loading is desirable. The relative amount of particles in a given sheet of the present invention is preferably at least about 65 percent (by weight), more preferably at least about 70 percent (by weight), and most preferably at least about 75 percent (by weight). Additionally, the weight percentage particles in the resulting sheet is at least 13 times greater than the weight percentage of binder, preferably at least 14 times greater than the weight percentage of binder, more preferably at least 15 times greater than the weight percentage of binder.

Sheet materials comprising Kevlar are particularly useful when radiolytic, hydrolytic, thermal, and chemical stability are desired. In most cases, such materials will exhibit resistance to swelling when exposed to solvents. Advantageously, Kevlar pulp can be blended with polyolefin pulp to provide a moldable or partially thermally fusible fiber to improve physical properties of the sheet material. In a preferred embodiment, the outer edges of a Kevlar blend disk can be thermally fused under pressure to prevent edge wicking. Thermal fusing of a Kevlar blend disk in various patterns can be useful for specific applications.

Other adjuvant fibers useful in this embodiment of the present invention include polytetrafluoroethylene (PTFE) which can be fibrillated in situ to assist in consolidating the pre-formed pulps. Polymer blended fibers are useful in particle loaded sheet articles. Blends of Kevlar with PTFE are particularly useful.

Desirably, the average pore size of the uniformly porous sheet material of the invention comprising polymer pulps, micro- or macrofibers, PTFE, or a combination thereof, can be in the range of 0.1 to 10 micrometers. Void volumes in the range of 20 to 80 percent can be useful, preferably 40 to 60 percent. Porosity of the sheet materials can be modified (increased) by including adjuvant hydrophilic or hydrophobic fibers, such as polypropylene or polyethylene fibers, of larger diameter or stiffness with the mixture to be blended.

The sheet materials of the present invention comprising sorptive polymer pulp or nonwoven matrices or membranes and sorptive or reactive particulate, have controlled porosity (i.e., are uniformly porous), and preferably have a Gurley time of at least 0.1 sec., preferably at least 2–4 seconds, and more preferably at least 4 seconds. The basis weight of the sheet materials can be in the range of 50 to 5000 g/m$^2$, preferably in the range of 100 to 1000 g/m$^2$, most preferably 150 to 400 g/m$^2$.

In use, any of the sheet materials of the present invention, which can be supported on a sheet or scrim (i.e., a porous backing), are challenged with a fluid, which preferably is a liquid, comprising at least one oxidant and optionally at least one analyte. It may be desirable to pre-wet the sheet material which can be in the form of a disk, pleated cartridge, etc., before passing the fluid through the sheet material. Vacuum or positive pressure can be used to accelerate the flow-through rate of the fluid.

The composite membrane of the invention is uniformly porous, preferably homogeneous, and preferably flexible. The various particulates (antioxidants and conventional SPE particles) can be in separate layers in a single sheet article or as in a stack of sheet articles, or they can be admixed in a single layer.

The composite membranes of the invention can remove ozone and other oxidants such oxides of nitrogen, e.g., $NO_x$ wherein x=1 or 2, halogens, and peroxides, from fluids containing analytes which are sensitive to oxidation. The membranes can be used in series with sorptive membranes, or oxidant scavenger particulates can be mixed in the same membrane with conventional SPE particulates as are known in the art, as a pre-reactant filter to remove oxidants from the fluid being sampled for the analyte.

The composite articles of the invention provide protection for oxidation-sensitive organic analytes during analytical procedures. The composite articles can be useful in remediation applications to remove airborne oxidants generated (which can act as human irritants), for example, by machinery or industrial processes.

Objects and advantages of this invention are further illustrated by the following examples. The particular materials and amounts thereof, as well as other conditions and details, recited in these examples should not be used to unduly limit this invention.

EXAMPLES

Test Procedure

This method is Essentially as Disclosed in B. E. Saltzman and D. N. Byers, *Industrial Hygiene Journal*, June (1958), pp. 251–257.

Calibrated concentrations of ozone were generated by passing laboratory air at a flow rate of 200±5 mL/min over the tip of a 10 cm high-voltage discharge probe (Baxter Healthcare, Inc., McGraw Park, Ill.) into a mixing chamber where the generated ozone was mixed with laboratory air flowing at 20 L/min, to provide an ozone concentration of approximately 10 ppm.

Output from the mixing chamber was led into a six-port sampling manifold, comprising a minimum of two potassium iodide (KI) impinger calibration samples per each trial. The impinger chambers (Ace Glass Inc., Vineland, N.J.) were modified with 12/5 ground glass ball joints and contained 10 mL 1.0% (w/v) aqueous KI (Fischer Scientific, Pittsburgh, Pa.) solution buffered to pH=6.8 with 0.20M aqueous ammonium acetate (Mallinckrodt AR Grade, Mallinckrodt Chemical, St. Louis, Mo.). Iodide reacts with ozone as follows:

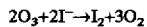

$$2O_3 + 2I^- \rightarrow I_2 + 3O_2 \qquad \text{I}$$

Ozone reacts with iodide ion oxidizing it to iodine as shown in Equation I. Iodine subsequently reacts with starch producing an intense blue color. Measurement of the intensity of this color at 560 nm provides quantification of the level of ozone present.

Iodine, formed as shown in Equation I, can also react with sodium thiosulfate and be reduced to iodide ion as shown in Equation II:

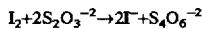

$$I_2 + 2S_2O_3^{-2} \rightarrow 2I^- + S_4O_6^{-2} \qquad \text{II}$$

A combination of ozone, iodide ion and thiosulfate ion can undergo cyclic reactions wherein ozone oxidizes the iodide to iodine; the iodine then oxidizes thiosulfate and is reduced back to iodide ion. This can be useful when release of elemental iodine is undesirable.

Ozone concentration standards were obtained in the absence of a test disk and found to be 10.0±0.4 ppm (n=6, i.e., six samples in the trial set). No spatial inhomogenieties were found (i.e., concentration did not depend on location of the impinger in the manifold). Ozone concentration in the impinger solution was measured by adding 10 drops of starch indicating solution (Eastern Chemical Div. of Admiral Specialty Products, Inc., Smithtown, N.Y.) to the impinger solution, mixing thoroughly and diluting at a ratio of 50:1 with the same 1% KI solution. Absorbance of the diluted solution at 560 nm was measured by a Hewlett Packard UV/VIS spectrometer, Model 8452A (Hewlett Packard Instruments, Palo Alto, Calif.) and compared to a fresh standard prepared by adding known amounts of iodine to 1% KI/starch indicator solution. Absorbance values from 0.03 to 0.63 were obtained for the calibration standards, corresponding to concentrations of ozone from 0.132 to 0.945 µg per mL of 1% KI solution. Generated ozone concentrations were an average of about 0.4 µg per mL.

Prior to each test run, the particle-loaded PTFE disks were prepared by placing a 47 mm disk in a Millipore 47 mm vacuum filter holder and rinsing the disk successively with 10 mL HPLC (High Pressure Liquid Chromatography)-grade methyl alcohol (Burdick & Jackson, Muskegon, Mich.), 10 mL HPLC-grade toluene (Burdick & Jackson) and 10 mL HPLC-grade acetone (Burdick & Jackson) under water aspirator vacuum. The disk was dried in a vacuum oven (Napco Scientific Co., Tualatin, Oreg.) at 60° C. and 25 mm Hg for 20 minutes. A 25 mm disk was then cut from the conditioned 47 mm disk and placed in a 25 mm Millipore filter holder for testing as described below. Disks designated as "EMPORE™" disks were obtained from 3M Company, St. Paul, Minn., and generally comprise an active particle enmeshed in a porous, fibrous, nonwoven poly (tetrafluoroethylene) (PTFE) membrane or web. Preparation and characterization of the disks is described in U.S. Pat. No. 5,071,610, the disclosure of which is incorporated herein by reference. Experimental PTFE disks (i.e., disks that were not commercially available) were prepared by the methods described in the noted U.S. Pat. No. 5,071,610. Each evaluation assembly consisted of a 25 mm test disk enclosed in a Millipore stainless steel filter holder (Millipore Corp., Bedford, Mass.) followed serially by an impinger having a standard buffered KI solution.

All chemicals and reagents were commercially available from Aldrich Chemical Co., Inc., Milwaukee, Wis., unless otherwise noted.

Example 1

Ozone Removal with Particle-loaded PTFE Disks

Solid phase extraction disks were tested for their ability to remove ozone from an air stream. Disks were exposed to ozone, as shown in Table 1, using 10 L of ozone mixture, as described above, flowing at 1 L/min.

In Table 1:

Samples 1A, 1C, 1I, and 1K–1N without additives were commercially available from 3M Company, St. Paul, Minn.; Samples 1D, 1H, and 1J were commercially available from Bio-Rad Laboratories, Hercules, Calif.; and Samples 1B and 1E–1G were prepared according to the method described in, e.g., U.S. Pat. No. 5,071,610, Example 1, incorporated herein by reference;

Samples 1O and 1P were comparative samples comprising porous webs having no enmeshed particles therein;

In all Tables:

SDVB means poly(styrene-co-divinylbenzene);

CHELEX™ is iminodiacetic acid-derivatized SDVB (Bio-Rad Laboratories, Hercules, Calif.);

FLORISIL™ is magnesium silicate (Floridin Co., Quincy, Fla.), 60–70 μm diameter, 90 percent by weight of SPE disk;

$C_{18}/SiO_2$ means $SiO_2$ particles derivatized with $C_{18}$ ligands;

$Na_2S_2O_3$ means sodium thiosulfate solution;

Zr/PBD means poly(butadiene), 4 percent by weight on 10 μm diameter zirconia particles, prepared according to U.S. Pat. No. 5,015,373, Example 21, 90 percent by weight of SPE disk;

alumina means $Al_2O_3$ (Scientific Adsorbents, Inc., Atlanta, Ga.), 40–50 μm diameter, 90 percent by weight of SPE disk; and SILICALITE™ means hydrophobic molecular sieves (UOP, Des Plaines, Ill.), nominally 3–5 μm diameter, 90 percent by weight of SPE disk;

$ZrO_2$, nominally 10 μm diameter particles, prepared according to U.S. Reissue Pat. No. 34,910, Example 1, 90% by weight of SPE disk;

$SiO_2$ means silica (Varian Products, Harbor City, Calif.), 8–10 μm nominal diameter particles, 90% by weight of SPE disk;

KI means 10 mL of 10% aqueous KI solution drawn through disk after solvent cleaning, followed by vacuum drying at 60° C. as described above;

KI+$Na_2S_2O_3$ means 10 mL of 10% aq. KI plus sodium thiosulfate solution (1:1 mixture) drawn through disk after solvent cleaning, followed by vacuum drying at 60° C. as described above;

Indigo Blue means 10 mL of 10% aq. Indigo Blue (CI 73000) solution drawn through disk after solvent cleaning, followed by vacuum drying at 60° C. as described above;

Cation exchange means Bio-Rex™ Ion Exchange Membrane loaded with AG™ 50W-X8 resin (Bio-Rad Laboratories, Hercules, Calif.);

Anion exchange means Bio-Rex™ Ion Exchange Membrane loaded with AG™-1X8 resin (Bio-Rad Laboratories, Hercules, Calif.).

TABLE 1

| Sample | Particle | Additive | Ozone Conc. ppm | Ozone mass, μg | % Ozone Captured |
|---|---|---|---|---|---|
| 1A | SDVB | — | 10.5 | 209 | 100 |
| 1B | Zr/PBD | — | 11.8 | 236 | 100 |
| 1C | Act. Carbon | — | 11.4 | 228 | 100 |
| 1D | CHELEX™ | — | 9.50 | 190 | 100 |
| 1E | FLORISIL™ | — | 10.2 | 205 | 66 |
| 1F | Alumina | — | 9.28 | 186 | 61 |
| 1G | $ZrO_2$ | — | 10.9 | 218 | 20 |
| 1H | Cation exchange | — | 10.4 | 208 | 36 |
| 1I | $C_{18}/SiO_2$ | — | 10.9 | 217 | 26 |
| 1J | Anion exchange | — | 11.5 | 231 | 23 |
| 1K | $SiO_2$ | — | 10.3 | 203 | 13 |
| 1L | $SiO_2$ | KI | 11.7 | 235 | 100 |
| 1M | $SiO_2$ | KI + $Na_2S_2O_3$ | 8.30 | 166 | 100 |
| 1N | $SiO_2$ | Indigo Blue | 15.1 | 301 | 100 |
| 1O (comparative) | (a) | — | 11.7 | 234 | 17 |
| 1P (comparative) | (b) | KI | 11.4 | 227 | 10 |

(a) Zitex™ PTFE filter (Norton Performance Plastics, Wayne, NJ) having no enmeshed particles (b) A/E™ glass fiber filter (Gelman Sciences, Ann Arbor, MI) having no enmeshed particles The data presented in Table 1 show that certain particle-loaded PTFE disks are capable of extracting ozone from an airstream, and that otherwise relatively inert particles, for example, Sample 1K, can be rendered capable of extracting ozone when coated with effective reducing agents such as potassium iodide and indigo blue dye, for example, as in Samples 1L–1N.

Similar results can be achieved using sheet materials of the present invention comprising sorptive polymer pulp or nonwoven matrices or membranes and sorptive or reactive particulate. Also, oxidants such as halogens or peroxides can be removed by this method.

Example 2

Ozone Removal in Presence of Oxidizable Analyte

The method of the invention was used to prevent or deter oxidation of oxidizable analytes sorbed in particle-loaded PTFE disks comprising individually each of styrene divinylbenzene copolymer particles, polybutadiene-coated zirconia particles, uncoated silica particles, silica particles coated with (a) 10% aqueous KI solution, (b) 10% aqueous sodium thiosulfate solution and (c) 1:1 mixture of 10% aqueous KI solution and 10% aqueous sodium thiosulfate solution, and a non-particle loaded glass fiber disk.

An ozone mixture was generated and pulled through the test disks as described above. Stock calibration solutions of oxidation-sensitive anthracene, benz(a)anthracene, and benzo(a)pyrene, which are referred to in combination as "Polynuclear Aromatic Hydrocarbons", or "PAHs", were prepared in toluene using 100, 50, 25, 10, 5, 2.5 and 1 μg/mL, respectively, of each of the PAHs. The calibration standards and test samples were analyzed by gas chromatography using a Hewlett Packard Model 5890 GC/FID (Gas Chromatography/Flame Ionization Detector, Hewlett Packard Instruments, Wilmington, Del.) with a 15 m×0.25 mm i.d.×0.1 μm film thickness DB-5 column (J & W Scientific Inc., Folsom, Calif.). The temperature program was: 125° C. for 2 min, then ramped to 300° C. at 10° C. per min, then held at 300° C. for 10 min. The injection port and detector were each held at 225° C.

In each trial, the results of which are shown in Table 2, three pairs of disks were used. Each pair was loaded with 25 μL of a toluene solution of 25, 10, and 5 μg/mL total PAHs, respectively, representing atmospheric concentrations of approximately 50, 20, and 10 nanograms total PAH mixture/$m^3$ air in a sample volume of 500 $m^3$ air, respectively. The sample disks were loaded with PAHs and solvent. The solvent was allowed to evaporate at room temperature for about one hour. The sample-loaded disks, also referred to as analyte-loaded disks, were then placed in a disk holder as described in Example 1 and subjected to flow of approximately 10 L of an air-ozone mixture of nominally 10 ppm ozone, at a rate of 1 L/min. The disks were removed from the disk holder and placed in an autosampling vial containing approximately 1 mL of toluene extraction solvent and allowed to equilibrate at room temperature for about one hour. Gas chromatographic analysis of the toluene eluant determined the amount of unoxidized PAHs remaining on each disk. Data in Table 2 are reported as an average percent recovery of each PAH from 6 disks±1 Standard Deviation.

In Table 2:

- Samples 2A–2E and 2H–2Q, without additives, were commercially available from 3M Company, St. Paul, Minn.; Samples 2F and 2G were prepared according to the method described in, e.g., U.S. Pat. No. 5,071,610, Example 1, incorporated herein by reference;
- Sample 2A was a comparative sample to validate the extraction method wherein PAHs were dissolved in a toluene solution in the presence of a SDVB-loaded disk, but were not sorbed onto the disk, and were not subjected to an ozone or air mixture at any time; referred to in the Table as "vial";
- Samples 2B, 2F, and 2J were comparative samples wherein PAHs were sorbed onto a disk comprising particles as noted, then eluted with toluene without being subjected to an ozone or air mixture at any time; referred to in the table as "disk";
- Samples 2C, 2H, 2K, and 2P were comparative samples wherein PAHs were sorbed on a disk comprising particles as noted, then subjected to 10 L of air flow but not to ozone; referred to in the table as "air";

Disks were prepared as described in Example 1;

Disks comprising additives were prepared as described in Example 1.

and 2Q, shows that all of the PAHs were completely oxidized when no ozone-reactive particle or coating was present, whereas most of the PAHs were recovered when ozone was preferentially reacted with an oxidant scavenger particle or a particle coated with an oxidant scavenger coating. Anthracene appeared to be the most easily oxidized of the three PAHs of the example, but the method of the invention using oxidant scavenger particles allowed for recovery of 50% or more of anthracene after exposure to ozone (Samples 2D, 2E, 2G, 2L, 2M, and 2N), in contrast to a 0% recovery when no oxidant scavenger particles were present (Samples 2I and 2Q).

Example 3

Ozone Removal Prior to Contact with SPE Disk

In this example, a particle-loaded PTFE disk was used as the first disk in a two-disk system in order to remove ozone mixed with air passing through the second particle-loaded PTFE disk (referred to as the SPE disk) in which oxidation-sensitive analytes were adsorbed. The apparatus described above in the Test Procedure was used, but two particle-loaded PTFE disks were placed in the disk holder in series, one atop the other. The top-most disk, that is, the disk first exposed to an air stream, comprised a particle-loaded PTFE disk (Sample 3A) or a coated particle-loaded disk (Sample 3B), and was the "protective" disk for the sample-loaded (e.g., the analyte-loaded) second disk. The second disk comprised particles as noted in Table 3, below, on which were sorbed the PAH analytes. No protective additive was present on the second disk in Sample 3B. Disks used in this Example, prior to treatment with additives, were commercially available from 3M Company, St. Paul, Minn.

Stock solutions of anthracene, benz(a)anthracene, and benzo(a)pyrene, at each of 25, 10 and 5 μg/mL total PAH in toluene, were sorbed onto the second (SPE) disk, as described in Example 2 (two disks at each PAH concentration). In each case, 10 L of a nominally 10 ppm ozone-air mixture were then drawn through the disks, the analytes were eluted from the SPE disk, and the amount of remaining analyte (individual PAH) was determined, as described in Example 2. Percent recovery of sorbed analyte is reported in Table 3.

TABLE 2

| | | | | Percent Recovery | | |
|---|---|---|---|---|---|---|
| Example | Particle | Condition | Additive | Anthracene | Benz(a)anthracene | Benzo(a)pyrene |
| 2A (comparative) | SDVB | vial | — | 100 ± 4 | 103 ± 6 | 102 ± 7 |
| 2B (comparative) | SDVB | disk | — | 95 ± 3 | 101 ± 4 | 98 ± 3 |
| 2C (comparative) | SDVB | air | — | 93 ± 3 | 97 ± 3 | 98 ± 3 |
| 2D | SDVB | ozone | — | 47 ± 7 | 58 ± 12 | 58 ± 14 |
| 2E | SDVB | ozone | KI + $Na_2S_2O_3$ | 51 ± 6 | 84 ± 3 | 70 ± 6 |
| 2F (comparative) | Zr/PBD | disk | — | 95 ± 1 | 88 ± 9 | 85 ± 12 |
| 2G | Zr/PBD | ozone | — | 59 ± 4 | 86 ± 11 | 63 ± 15 |
| 2H (comparative) | $SiO_2$ | air | — | 82 ± 2 | 87 ± 4 | 79 ± 7 |
| 2I | $SiO_2$ | ozone | — | 0 | 0 | 0 |
| 2J (comparative) | $C_{18}/SiO_2$ | disk | KI | 92 ± 3 | 93 ± 4 | 93 ± 2 |
| 2K (comparative) | $C_{18}/SiO_2$ | air | KI | 83 ± 4 | 95 ± 4 | 85 ± 7 |
| 2L | $C_{18}/SiO_2$ | ozone | KI | 73 ± 8 | 86 ± 5 | 75 ± 5 |
| 2M | $C_{18}/SiO_2$ | ozone | $Na_2S_2O_3$ | 45 ± 5 | 68 ± 3 | 43 ± 1 |
| 2N | $C_{18}/SiO_2$ | ozone | KI + $Na_2S_2O_3$ | 73 ± 5 | 87 ± 4 | 78 ± 4 |
| 2P (comparative) | $C_{18}/SiO_2$ | air | — | 83 ± 4 | 90 ± 5 | 85 ± 7 |
| 2Q | $C_{18}/SiO_2$ | ozone | — | 0 | 0 | 0 |

Data presented in Table 2 show that oxidation of certain oxidation-sensitive polynuclear aromatic hydrocarbons (PAHs) sorbed in a disk was prevented or significantly reduced by the presence of certain oxidant scavenger particles, such as SDVB, or by the presence of certain particles coated with oxidant scavenger materials, such as poly(butadiene), potassium iodide, sodium thiosulfate, or combinations thereof. In particular, a comparison of Samples 2H and 2I, as well as a comparison of Samples 2P

TABLE 3

| Sample | Disks | Additive | Percent Recovery | | |
|---|---|---|---|---|---|
| | | | Anthracene | Benz(a)anthracene | Benzo(a)pyrene |
| 3A | SDVB | — | 91 ± 4 | 96 ± 3 | 97 ± 2 |
| 3B | $C_{18}/SiO_2$ | 10% KI + $Na_2S_2O_3$ | 90 ± 5 | 96 ± 2 | 93 ± 6 |

The example shows that the method of the invention can be used to prevent or minimize oxidation by ozone of a sensitive analyte by allowing the ozone-containing stream to first contact an oxygen scavenger particle-loaded PTFE disk or a particle-loaded PTFE disk wherein the particles were coated with an ozone absorbing material. Recoveries of PAHs shown for Sample 3A were significantly better than recoveries shown in Table 2, Sample 2D, wherein no protective disk was used. Similarly, recoveries of PAHs shown for Sample 3B were significantly better than recoveries shown in Table 2, Sample 2Q.

Example 4

Nitrogen Oxide Removal by Particle-loaded PTFE Disk

This example shows that particle-loaded PTFE disks were capable of removing nitrogen oxide ($NO_2$) from a gas stream.

Nitrogen oxide from a cylinder of 99.95+% $NO_2$ was diluted in the apparatus described for ozone, above, to provide a controlled flow of air approximately 0.04 ppm of $NO_2$. $NO_2$ concentration was measured by pulling the gas stream through an impinger containing N-(1-naphthyl)-ethylenediamine dihydrochloride (NEDA) and sulfanilic acid in aqueous acetic acid, then measuring absorbance at 540 nm using a Hewlett Packard 8452A UV/VIS Spectrophotometer. The test reagent was prepared according to the method or B. E. Saltzman, *Analytical Chemistry*, 26 (12) p. 1949 (1954) by dissolving 0.1 g NEDA in 100 mL deionized (DI) water and adding 20 mL of this solution to a solution of 5 g sulfanilic acid in 900 mL DI water containing 140 mL glacial acetic acid, then diluting the total mixture to one liter with DI water. Results are shown in Table 4, below.

In Table 4:
Samples 4A–4D were commercially available from Bio-Rad Laboratories, Hercules, Calif.; Samples 4E and 4H were prepared according to the method described in, e.g., U.S. Pat. No. 5,071,610, Example 1, incorporated herein by reference; and Samples 4F and 4G were commercially available from 3M Company, St. Paul, Minn.

TABLE 4

| Sample | Particle | Treatment (a) | Sample size, L | $NO_2$ Conc., ppm | $NO_2$ Mass, µg | % $NO_2$ Removed |
|---|---|---|---|---|---|---|
| 4A | CHELEX™ | — | 11 | 0.04 | 0.50 | 0 |
| 4B | CHELEX™ | 100 mL 0.1N $HNO_3$ | 11 | 0.06 | 1.94 | 0 |
| 4C | CHELEX™ | 100 mL 0.1N NaOH | 16 | 0.03 | 1.11 | 100 |
| 4D | CHELEX™ | 100 mL 0.1N NaOH | 1.6 | 15.9 | 46.6 | 77 |
| 4E | Zr/PBD | — | 16 | 0.02 | 0.66 | 100 |
| 4F | SDVB | — | 16 | <–0.001 | <–0.04 | 100 |
| 4G | Act. Carbon | — | 16 | 0.02 | 0.66 | 100 |
| 4H | Silicalite | — | 16 | 0.02 | 0.66 | 61 |

(a) Disk was washed as described after solvent wash and before vacuum oven drying Data presented in Table 4 show that certain particle-loaded PTFE disks were capable of removing nitrogen oxide from a gas stream. The Example also showed that, when acidified, iminodiacetic acid-derivatized SDVB was not effective in removing $NO_2$ (Samples 4A and 4B), whereas, when treated with base (Sample 4C), iminodiacetic acid-derivatized SDVB was very effective. At very high $NO_2$ levels, base-treated iminodiacetic acid-derivatized SDVB was moderately effective (Sample 4D).

Various modifications and alterations that do not depart from the scope and spirit of this invention will become apparent to those skilled in the art. This invention is not to be unduly limited to the illustrative embodiments set forth herein.

We claim:

1. A method for removing an oxidant from a fluid comprising the step of passing a fluid including said oxidant through at least one solid phase reaction article comprising a porous membrane having incorporated therein an antioxidant, said antioxidant consisting essentially of oxidant scavenger particulates which react chemically in an oxidation-reduction reaction with said oxidant, said oxidant scavenger particulates being selected from the group consisting of 1) polymeric organic particulates or derivatives thereof having readily oxidizable sites, and inert particulates coated with said polymers, and 2) inorganic coated particulates having coatings selected from the group consisting of potassium iodide, sodium thiosulfate, potassium iodide+ sodium thiosulfate, and Indigo Blue, said oxidant being active towards organic compounds.

2. The method according to claim 1 wherein said oxidant is selected from the group consisting of ozone, oxides of nitrogen, halogens, and peroxides.

3. The method according to claim 1 wherein said oxidant is removed by chemical reaction with said oxidant scavenger particulates in an oxidation-reduction reaction.

4. The method according to claim 1 wherein said scavenger particulates comprise KI-coated particulates or a combination of KI- and $Na_2S_2O_3$-coated particulates.

5. The method according to claim 1 wherein said scavenger particulates comprise polymer or polymer-coated particulates wherein said polymer chemically reacts with said oxidant.

6. The method according to claim 5 wherein said polymer or polymer-coated particulates comprise polybutadiene.

7. The method according to claim 5 wherein said polymer or polymer-coated particulates comprise poly(styrene divinylbenzene) or derivatives thereof.

8. The method according to claim 1 wherein said porous membrane further comprises sorptive activated carbon particulates or activated carbon coated particulates in addition to oxidant scavenger particulates which undergo oxidation-reduction with said oxidant.

9. The method according to claim 1 wherein said scavenger particulates comprise Indigo Blue-coated particulates.

10. The method according to claim 1 wherein said scavenger particulates comprise iminodiacetic acid derivatized poly(styrene divinylbenzene) particulates.

11. The method according to claim 1 wherein said porous membrane comprises a fibrillated polymer.

12. The method according to claim 11 wherein said fibrillated polymer comprises polytetrafluoroethylene (PTFE).

13. The method according to claim 1 wherein said porous membrane comprises a nonwoven web.

14. The method according to claim 13 wherein said nonwoven web further comprises a binder.

15. The method according to claim 13 wherein said nonwoven web comprises melt-blown microfibers.

16. The method according to claim 13 wherein said nonwoven web is selected from the group consisting of polyolefin, polyacrylamide, polyacrylonitrile, glass, polyacrylates, polyamides, and polyvinylhalide fibers.

17. The method according to claim 13 wherein said nonwoven web comprises macrofibers.

18. The method according to claim 13 wherein said nonwoven web comprises polymeric pulp.

19. The method according to claim 18 wherein said polymeric pulp is selected from the group consisting of polyamide, polyolefin, aromatic polyamide, and aramid fibers.

20. The method according to claim 1 wherein said porous membrane further comprises one or more additional conventional filter media or conventional solid phase extraction article laminated or stacked in registration.

21. A solid phase reaction article comprising a porous membrane having incorporated therein an antioxidant, said antioxidant consisting essentially of oxidant scavenger particulates which react chemically in an oxidation-reduction reaction with an oxidant, said oxidant scavenger particulates being selected from the group consisting of 1) polymeric organic particulates or derivatives thereof having readily oxidizable sites, and inert particulates coated with said polymers, and 2) inorganic coated particulates having coatings selected from the group consisting of potassium iodide, sodium thiosulfate, potassium iodide+sodium thiosulfate, and Indigo Blue, wherein said particulates have been reacted with the oxidant selected from the group consisting of ozone, oxides of nitrogen, halogens, and peroxides, to produce an oxidized form of said scavenger particulates.

22. The article according to claim 21 wherein said particulates have a size in the range of 0.1 to 150 micrometers.

23. The article according to claim 21 which is laminated or stacked in registration with a conventional filter medium or a conventional solid phase extraction article.

* * * * *